United States Patent [19]

Angus

[11] Patent Number: 4,786,347

[45] Date of Patent: * Nov. 22, 1988

[54] METHOD OF MANUFACTURING AN ANNULAR BLADED MEMBER HAVING AN INTEGRAL SHROUD

[75] Inventor: James P. Angus, Penrith, England

[73] Assignee: Rolls-Royce plc, London, England

[*] Notice: The portion of the term of this patent subsequent to May 31, 2005 has been disclaimed.

[21] Appl. No.: 741,584

[22] Filed: Jun. 5, 1985

[30] Foreign Application Priority Data

Jul. 7, 1984 [GB] United Kingdom ............... 8417419

[51] Int. Cl.$^4$ ............................................. B65H 81/00
[52] U.S. Cl. ........................................ 156/172; 156/245; 164/900; 264/108; 264/257; 264/317; 416/198 A; 416/230
[58] Field of Search ............... 416/189 R, 195, 244 A, 416/230 R, 215, 216, 230 R; 164/900; 264/328.18, 328.1, 328.2, 328.4, 328.5, 328.6, 328.8, 328.12, 238.17; 74/572

[56] References Cited

U.S. PATENT DOCUMENTS

| | | | |
|---|---|---|---|
| 3,279,967 | 10/1966 | Martin et al. ............... | 416/230 R X |
| 3,403,844 | 10/1968 | Stoffer ................... | 416/230 |
| 3,501,090 | 3/1970 | Stoffer et al. ............ | 416/230 X |
| 3,549,444 | 12/1970 | Katz ..................... | 156/175 |
| 3,556,675 | 1/1971 | Howald et al. ............. | 416/230 X |
| 3,616,508 | 11/1971 | Wallett .................. | 29/156.8 R |
| 3,632,460 | 1/1972 | Palfreyman et al. ........ | 156/175 |
| 3,754,839 | 8/1973 | Bodman .................. | 416/195 |
| 3,846,045 | 11/1974 | Mincuzzi ................ | 416/230 |
| 3,880,978 | 4/1975 | Apostoleris et al. ........ | 264/328.12 |
| 3,901,961 | 8/1975 | Görter et al. ............. | 264/108 |
| 3,932,062 | 1/1976 | Sisk .................... | 416/230 |
| 4,098,559 | 7/1978 | Price ................... | 416/218 X |
| 4,203,732 | 5/1980 | Phaal ................... | 264/108 |
| 4,248,817 | 2/1981 | Frank ................... | 264/328.2 |
| 4,312,917 | 1/1982 | Hawley ................. | 264/254 |
| 4,339,229 | 7/1982 | Rossman ................ | 416/218 |
| 4,414,171 | 11/1983 | Duffy et al. ............. | 416/241 A |
| 4,576,770 | 3/1986 | Schultz ................. | 264/103 |
| 4,654,181 | 3/1987 | Brandenstein ........... | 264/328.1 |
| 4,671,739 | 6/1987 | Read et al. ............. | 416/241 A |

FOREIGN PATENT DOCUMENTS

77908 6/1977 Japan ............... 416/230 R

Primary Examiner—Michael W. Ball
Assistant Examiner—David Herb
Attorney, Agent, or Firm—Cushman, Darby & Cushman

[57] ABSTRACT

A gas turbine engine disc having integral, radially extending aerofoil blades and an integral shroud interconnecting the radially outer extents of the blades is described. In the manufacture thereof continuous fibres are wound around an annular array of inserts provided in a dividable disc. The inserts define the spaces between adjacent blades on the disc. A mixture of chopped carbon fibre and an epoxy resin matrix material is then injected into the central portion of the die interior. Any part of the wound fibres which has not been impregnated by the chopped fibre/resin matrix material is subsequently impregnated by a matrix material whereupon the die is opened to release the thus produced bladed disc.

9 Claims, 3 Drawing Sheets

METHOD OF MANUFACTURING AN ANNULAR BLADED MEMBER HAVING AN INTEGRAL SHROUD

This invention relates to an annular bladed member having an integral shroud and in particular to an annular bladed member having an integral shroud which bladed member is formed from a fibre reinforced composite material. The invention also relates to a method of manufacturing such a bladed member.

It is known to manufacture discs with integral aerofoil blades, for instance those which are suitable for use in an axial flow compressor of a gas turbine engine, by injecting an appropriate resin matrix material into a die which contains reinforcing fibres which have been aligned in a predetermined manner. There are problems with such a method of manufacture however in ensuring that the fibres remain in the desired configuration during the injection moulding operation. Moreover it is difficult to ensure that all of the fibres are so disposed as to provide a bladed disc with optimum strength characteristics. A further disadvantage of the method is that it can be expensive in view of the fact that the reinforcing fibres usually have to be laid up by hand.

It is an object of the present invention to provide an annular bladed member formed from a fibre reinforced composite material which is cheap to manufacture and has good strength characteristics. It is an additional object of the present invention to provide a method of manufacturing such an annular member.

According to the present invention, an annular bladed member comprises a disc having a plurality of integral radially extending aerofoil blades on the periphery thereof and a central aperture and an integral shroud interconnecting the radially outer extents of said blades, said disc and aerofoil blades being formed from a composite material comprising a plurality of short reinforcing fibres dispersed within a matrix material, at least the majority of said short reinforcing fibres within said aerofoil blades being generally radially aligned, said shroud being formed from substantially continuous circumferentially extending reinforcing fibre enclosed in a matrix material.

According to a further aspect of the present invention, a method of manufacturing an annular bladed member comprising a disc having a plurality of radially extending aerofoil blades on the periphery thereof and a central aperture and an integral shroud interconnecting the radially outer extents of said blades from a fibre reinforced composite material comprises locating a ring-shaped shroud member comprising substantially continuous circumferentially extending reinforcing fibre enclosed in a matrix material around the radially outer extents of an annular array of inserts provided in a dividable die defining the form of said integral bladed member, said inserts being so configured as to define the spaces between adjacent aerofoil blades, closing said die and injecting a mixture of short fibres dispersed in a matrix material into the central portion of said die interior so that said mixture fills said central portion and flows between said inserts to reach and abut said ring shaped shroud member so that the majority of said short fibres, between said inserts, are generally radially aligned.

According to a further aspect of the present invention, a method of manufacturing an annular bladed member comprising a disc having a plurality of integral radially extending aerofoil blades on the periphery thereof and a central aperture and an integral shroud interconnecting the radially outer extents of said blades from a fibre reinforced composite material comprises winding a substantially continuous fibre around the radially outer extents of an annular array of inserts provided in a dividable die defining the form of said integral bladed member, said inserts being so configured as to define the spaces between adjacent blades on said disc, so that said fibre constitutes the reinforcing fibre of said shroud, closing said die and injecting a mixture of short fibres dispersed in a matrix material into the central portion of said die interior so that said mixture fills said central portion and flows between said inserts, so that the majority of said short fibres between said inserts are generally radially aligned, to impregnate said wound fibre, injecting a matrix material into said wound fibre so as to impregnate any part thereof which has not been impregnated by said mixture of matrix material and short fibres so as to define said integral shroud and subsequently opening said die to release the thus produced integral bladed member.

The invention will now be described, by way of example, with reference to the accompanying drawings in which FIGS. 1 to 5 illustrates various stages in the method of manufacturing a bladed disc having an integral shroud in accordance with the present invention.

Figure 1:
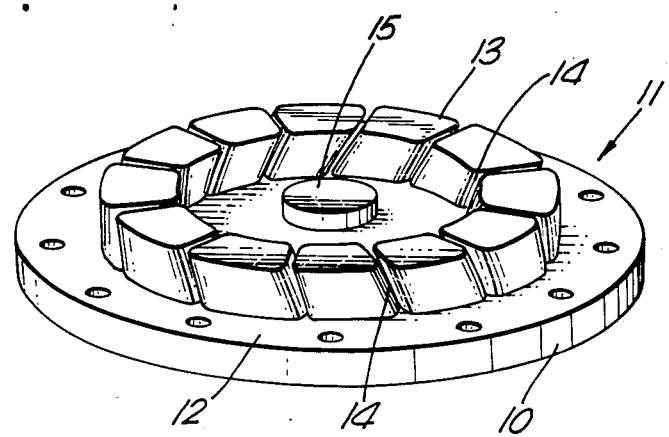

With reference to FIGS. 1 to 5, one part 10 of a dividable die 11 comprises a disc-shaped portion 12 upon which is fixed an annular array of inserts 13. The inserts 13 are so configured that the adjacent surfaces 14 thereof cooperate to define the flanks of an annular array of radially extending circumferentially spaced apart aerofoil blades. The disc-shaped portion 12 is additionally provided with a cylindrical insert 15 at the centre thereof for the purpose of defining a central hole in the bladed disc which is to be produced.

Figure 2:
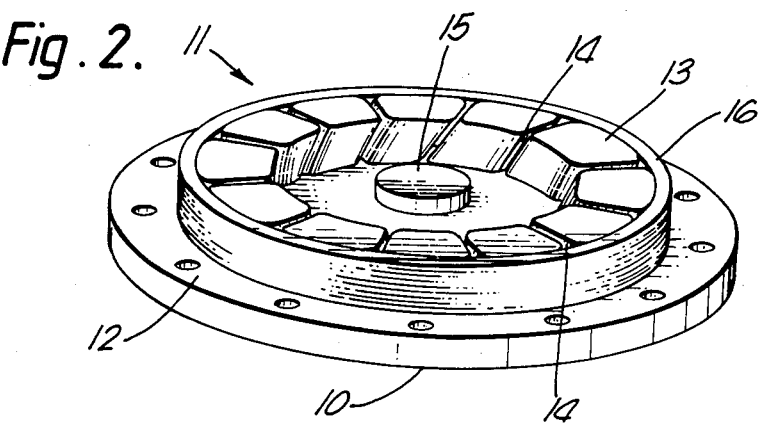
Figure 3:
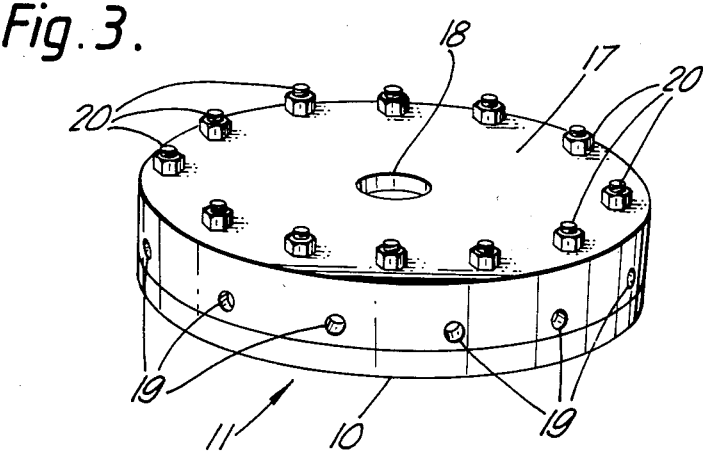

A dry continuous length of carbon fibre 16 is wound under tension around the radially outer extents of the inserts 13 to define a ring of fibre as can be seen in FIG. 2 which will constitute the reinforcement of a continuous shroud on the bladed disc which is to be produced. Such a shroud is necessary in order to resist the centrifugal loads imposed upon the aerofoil blades during rotation. The die 11 is then closed as can be seen in FIG. 3 by the other portion 17 thereof to define an enclosure which defines the form of a bladed disc having a continuous integral shroud. The die 11 has a central access port 18 and a plurality of radially outer access ports 19 around its peripheral surface. A plurality of nuts and bolts 20 serve to hold the die parts 10 and 17 together.

Figure 4:
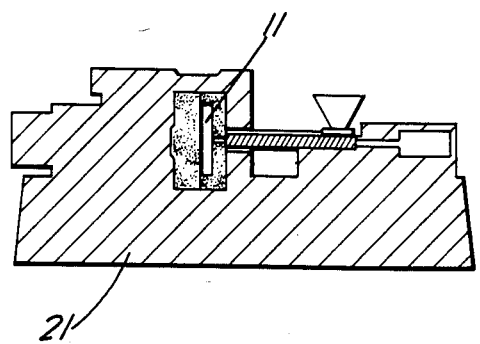
Figure 5:
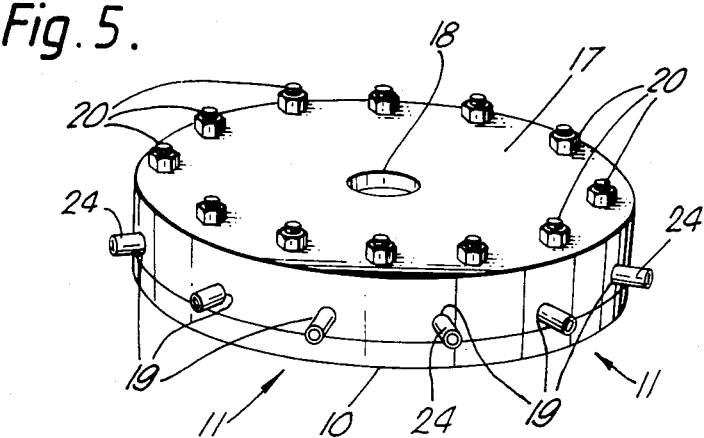
Figure 6:
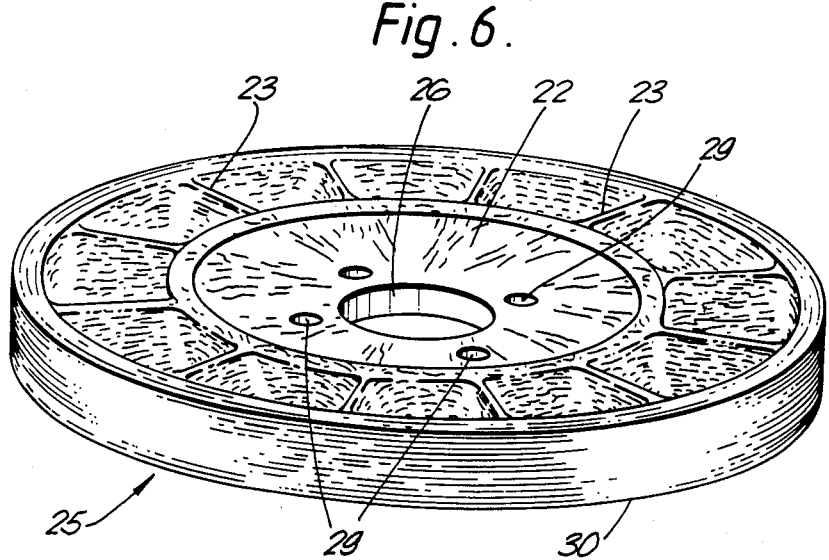
FIG. 6 illustrates a bladed disc in accordance with the present invention.
Figure 7:
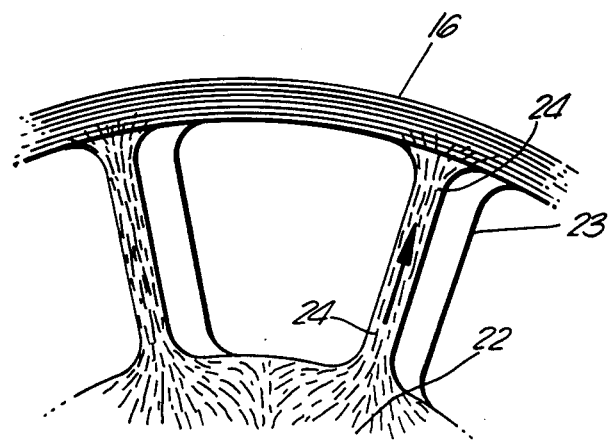
FIG. 7 is a sectioned view of a portion of the bladed disc shown in FIG. 6.

The die 11 is then placed in a conventional injection moulding machine 21 as shown in FIG. 4 and a mixture of short chopped carbon fibres and an epoxy resin is injected into the die 11 through its central access port 18. The fibre/resin mixture fills the central cavity within the die 11 to define a disc 22 as can be seen in FIG. 6, and then flows between the adjacent surfaces 14 of the inserts 13 to define a plurality of radially extending aerofoil blades 23 (also shown in FIG. 6) which are integral with the disc 22. FIG. 7 indicates the flow pattern of the fibre/resin mixture after it has flowed between the inserts 13. It will be seen that the constriction to flow provided by the inserts 13 causes the individual chopped fibres 24 between the inserts 13 to align in a radial direction. Moreover the chopped fibres 24 in the regions of the radially inner parts of the aerofoil blades 23, although not radially extending, are so disposed as to promote a strong bond between the aerofoil blades 23 and the disc 22. It will also be seen from FIG. 7 that some of the injected fibre/resin mixture flows into the wound carbon fibre 16 surrounding the inserts 13. This causes a certain degree of impregnation of the wound carbon fibre 16 so that there is mechanical interlinking of the chopped fibres 24 with the would fibre 16. It will be seen therefore that this interaction of chopped and wound fibre results in a strong bond between the thus formed aerofoil blades 23 and the wound fibre 16.

Completion of the inpregnation of the wound carbon fibre 16 is achieved by injecting an epoxy resin through delivery tubes 24 inserted into the access ports 19 in the die portion 17, thereby defining the continuous integral shroud 30 which interconnects the radially outer extents of the aerofoil blades 23.

As soon as complete impregnation of the wound carbon fibre 16 has been achieved, the die 11 is placd in an oven and subjected to an appropriate heating cycle in order to cure the resin. The die 11 is then removed from the oven and allowed to cool before being divided to provide access to the thus produced bladed disc 25 which can be seen in FIG. 6.

Figure 8:
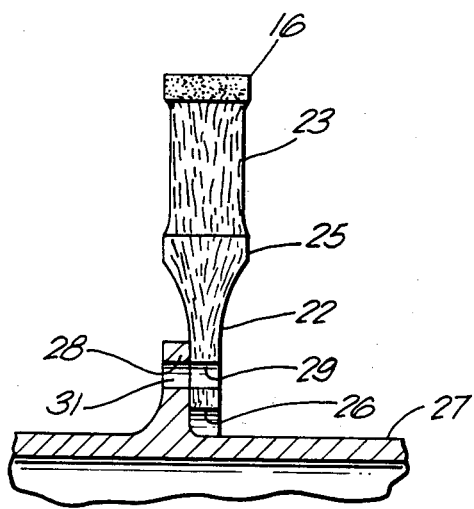
FIG. 8 is a sectioned view of a portion of the bladed disc shown in FIG. 6 when mounted on a rotary shaft.

As stated earlier the cylindrical insert 15 serves to define a central hole in the bladed disc 25 and this can be seen in FIG. 6 as the hole 26. The hole 26 facilitates the mounting of the bladed disc 25 on a rotatable gas turbine engine shaft 27 part of which can be seen in FIG. 8. A flange 28 is provided on the shaft 27 to receiver the bladed disc 25. Aligned apertures 29 and 31 respectively are provided in the bladed disc 25 and flange 28 to accept bolts (not shown) which attach the two to each other.

In an alternative method of manufacture in accordance with the present invention, the above described method is repeated with the exception that the wound fibre 16 is replaced by a ready formed ring-shaped shroud member and the shroud injection step is omitted. Such a shroud member would comprise continuous carbon fibre in an epoxy resin matrix material. In such a method of manufacture however, the injected fibe/resin mixture would not of course impregnate the shroud. The epoxy resin in the shroud could be cured prior to injection moulding or alternatively could be uncured so that it is subsequently cured along with the expoxy resin in the injected fibre/resin mixture.

Although the present invention has been described with reference to the manufacture of a bladed disc 25 which is made from carbon fibre, both chopped and continuous, in an epoxy resin matrix, other suitable materials may be used if so desired. Thus the shroud 30 of the bladed disc 25 could be reinforced by fibres of silicon carbide, steel or alumina and have a matrix material of aluminium or alloys thereof, magnesium or alloys thereof, titanium or alloys theeof or a polyimide resin. Similarly the disc 22 and aerofoil blades could be injection moulded with chopped fibres of silicon carbide or alumina in a matrix of aluminium or alloys thereof or magnesium, or alloys thereof or titanium or alloys thereof or alternatively in a matrix of a high temperature resistant thermoplastic polymer such as a polyetheretherketone or a polyethersulphone. Moreover the disc 22 and aerofoil blades 23, and the shroud 30 need not be formed from the same combination of fibre and matrix material.

It is envisaged that the method of the present invention could be used in the manufacture of bladed rotors 25 which are so configured with re-entrant features that they could not be easily removed from the die 11 after moulding. In such circumstances, mould inserts 13 for instance could be used which are made from a low melting point alloy. The alloy would be melted out prior to the removal of the bladed disc 25 from the die 11. If the bladed rotor 25 is made from a fibre reinforced metal matrix material then water dispersible ceramic based inserts 13 could be used instead.

Although the present invention has been described with reference to a bladed rotor and a method of manufacturing such a bladed rotor, it will be appreciated that it is not restricted to rotor members and that it could be applied to stator members. In the case of a stator annular bladed member, the disc supporting the aerofoil blades would have a larger diameter aperture in the centre thereof so that the apertured disc is effectively a ring member providing support for the radially inner portions of the aerofoil blades.

I claim:

1. A method of manufacturing an integral bladed member comprising:
   winding a substantially continuous fibre around radially outer extents of an annular array of inserts provided on a dividable die defining the form of said integral bladed member, said inserts being so configured as to define spaces between adjacent blades on said member, so that said fibre constitutes the reinforcing fibre of an integral shroud interconnecting the radially outer extends of said blades,
   closing said die and injecting a mixture of short fibres in a matrix material into the central portion of said die interior so that said mixture fills said central portion and flows between said inserts so that the majority of said short fibres between said inserts are generally radially aligned to partially impregnate said wound fibre,
   injecting a matrix material into said wound fibre so as to impregnate any part thereof which has not been impregnated by said mixture of a matrix material and short fibres so as to define said integral shroud, and
   subsequently opening said die to release the thus produced integral bladed member.

2. A method of manufacturing an integral bladed member as claimed in claim 1 wherein said substantially continuous fibre wound around the radially outer extents of said inserts is so wound under tension.

3. A method of manufacturing an integral bladed member comprising:
   locating a ring-shaped shroud member comprising substantially continuous circumferentially extending reinforcing fibre enclosed in a matrix material around radially outer extents of an annular array of inserts provided in a dividable die defining the form of an integral bladed member, said inserts being so configured as to define spaces between adjacent aerofoil blades ,
   closing said die, and
   injecting a mixture of short fibres dispersed in a matrix material into the central portion of said die interior so that said mixture fills said central portion and flows between said inserts to reach and abut said ring shaped shroud member so that inter-linking between said short fibres and said reinforcing fibre of said ring-shaped shroud member occurs and said short fibres, at least between said inserts, are generally radially aligned.

4. A method of manufacturing an integral bladed member as claimed in claim 1, wherein said substantially continuous fibre in said integral shroud are selected from the group coprising carbon, silicon carbide, steel and alumina.

5. A method of manufacturing an integral bladed member as claimed in claim 1 wherein said short fibres are selected from the group comprising carbon, silicon carbide and alumina.

6. A method of manufacturing an integral bladed member as claimed in claim 1 wherein said matrix material mixed with said short fibres is selected from the group comprising an epoxy resin, a polyetheretherketone resin, a polyethersulphone resin, aluminum or an alloy thereof, magnesium or an alloy thereof, and titanium or an alloy thereof.

7. A method of manufacturing an integral bladed member as claimed in claim 1 wherein said matrix material in said integral shroud is selected from the group comprising epoxy resin, a polyimide, aluminium or an alloy thereof, magensium or an alloy thereof, and titanium or an alloy thereof.

8. A method of manufacturing an integral bladed member as claimed in claim 1 wherein said inserts are formed from a low melting point alloy, said alloy being melted prior to the removal of said thus produced bladed member from said die.

9. A method of producing an integral bladed member as claimed in claim 1 wherein said inserts are formed from a water dispersible ceramic based composition.

* * * * *